(12) United States Patent
Demptos et al.

(10) Patent No.: US 10,710,551 B2
(45) Date of Patent: Jul. 14, 2020

(54) IGNITION DEVICE FOR A MOTOR OF AN AUTOMOTIVE VEHICLE

(71) Applicant: U-SHIN FRANCE, Creteil (FR)

(72) Inventors: Philippe Demptos, Créteil (FR); Christophe Perrin, Créteil (FR)

(73) Assignee: U-SHIN FRANCE, Creteil (FR)

( * ) Notice: Subject to any disclaimer, the term of this patent is extended or adjusted under 35 U.S.C. 154(b) by 98 days.

(21) Appl. No.: 15/710,181

(22) Filed: Sep. 20, 2017

(65) Prior Publication Data
US 2018/0009415 A1 Jan. 11, 2018

Related U.S. Application Data

(63) Continuation of application No. PCT/EP2016/052010, filed on Jan. 30, 2016.

(30) Foreign Application Priority Data

Mar. 20, 2015 (EP) .................................... 15305412

(51) Int. Cl.
*B60R 25/20* (2013.01)
*B60R 25/02* (2013.01)
(Continued)

(52) U.S. Cl.
CPC ........ *B60R 25/2063* (2013.01); *B60R 25/002* (2013.01); *B60R 25/02* (2013.01);
(Continued)

(58) Field of Classification Search
CPC ... B60R 25/002; B60R 25/003; B60R 25/007; B60R 25/02; B60R 25/021; B60R 25/22;
(Continued)

(56) References Cited

U.S. PATENT DOCUMENTS

| 4,972,692 A | * | 11/1990 | Morikawa | ......... B60R 25/02102 70/186 |
| 5,641,999 A | | 6/1997 | Kawashima | |
| 5,656,867 A | * | 8/1997 | Kokubu | ................ B60R 25/021 180/287 |

(Continued)

FOREIGN PATENT DOCUMENTS

| EP | 0742127 | 11/1996 |
| EP | 0800971 | 10/1997 |
| EP | 1074440 | 2/2001 |

OTHER PUBLICATIONS

International Search Report for International Application PCT/EP2016/052010, dated Apr. 5, 2016.

*Primary Examiner* — Christopher J Boswell
(74) *Attorney, Agent, or Firm* — Burris Law, PLLC

(57) ABSTRACT

An ignition device for a motor of an automotive vehicle is provided that the device includes a rotor configured to receive a key and mounted in rotation on a bracket, the rotor including a retainer configured to retain the rotor in translation relative to the bracket, and a first push back device configured to apply a linear force between the bracket and the rotor along an axis parallel to the axis of the rotation of the rotor. The bracket and the retainer are configured to cooperate so as to inhibit the rotation of the rotor in a predetermined direction from a predetermined angular position and to allow the rotation of the rotor beyond the predetermined angular position in the predetermined direction upon preliminarily applying a force on the rotor in an opposite direction to the direction of the linear force applied by the first push back device.

20 Claims, 4 Drawing Sheets

Figure 1:
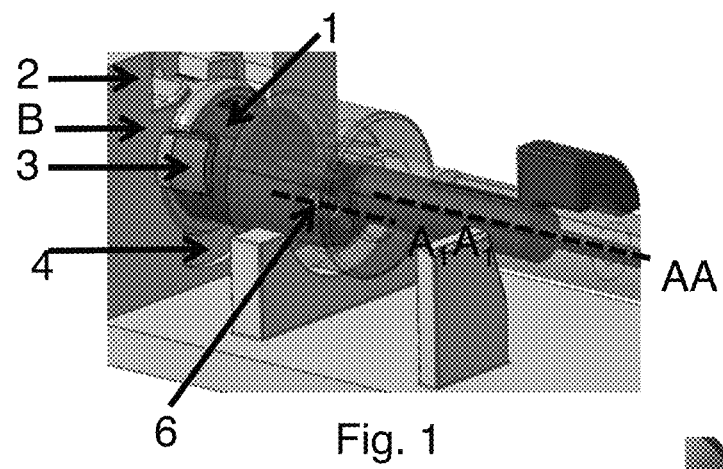

(51) Int. Cl.
  *E05B 15/00* (2006.01)
  *E05B 27/00* (2006.01)
  *B60R 25/00* (2013.01)
(52) U.S. Cl.
  CPC ........ *E05B 15/006* (2013.01); *E05B 27/0007* (2013.01); *E05B 2015/0066* (2013.01)
(58) Field of Classification Search
  CPC ... B60R 25/225; B60R 25/2063; E05B 11/00; E05B 13/00; E05B 15/0053; E05B 15/006; E05B 2015/0066; E05B 27/0007; E05B 27/001; E05B 79/02; E05B 85/04; E05B 85/06
  See application file for complete search history.

(56) References Cited

U.S. PATENT DOCUMENTS

| | | | | |
|---|---|---|---|---|
| 5,829,284 | A * | 11/1998 | Yamashita | B60R 25/02115 70/215 |
| 6,327,882 | B1 * | 12/2001 | Canard | B60R 25/02118 70/186 |
| 6,751,991 | B2 * | 6/2004 | Tamukai | B60R 25/04 70/186 |
| 6,826,934 | B2 * | 12/2004 | Canard | B60R 25/02131 70/181 |
| 6,941,779 | B2 * | 9/2005 | Shigeyama | B60R 25/02126 70/186 |
| 7,299,669 | B1 * | 11/2007 | Chung | B60R 25/02142 70/186 |
| 8,011,215 | B2 * | 9/2011 | Flandrinck | E05B 17/0058 70/379 R |
| 8,234,895 | B2 * | 8/2012 | Nakamoto | B60R 25/02 70/182 |
| 9,376,838 | B2 * | 6/2016 | Ino | E05B 17/041 |
| 9,605,447 | B2 * | 3/2017 | Yano | E05B 29/00 |
| 9,816,290 | B2 * | 11/2017 | Yamaguchi | E05B 29/00 |
| 2017/0158166 | A1 * | 6/2017 | Trischberger | B60R 25/007 |
| 2017/0190315 | A1 * | 7/2017 | Pieper | B60R 25/2063 |

* cited by examiner

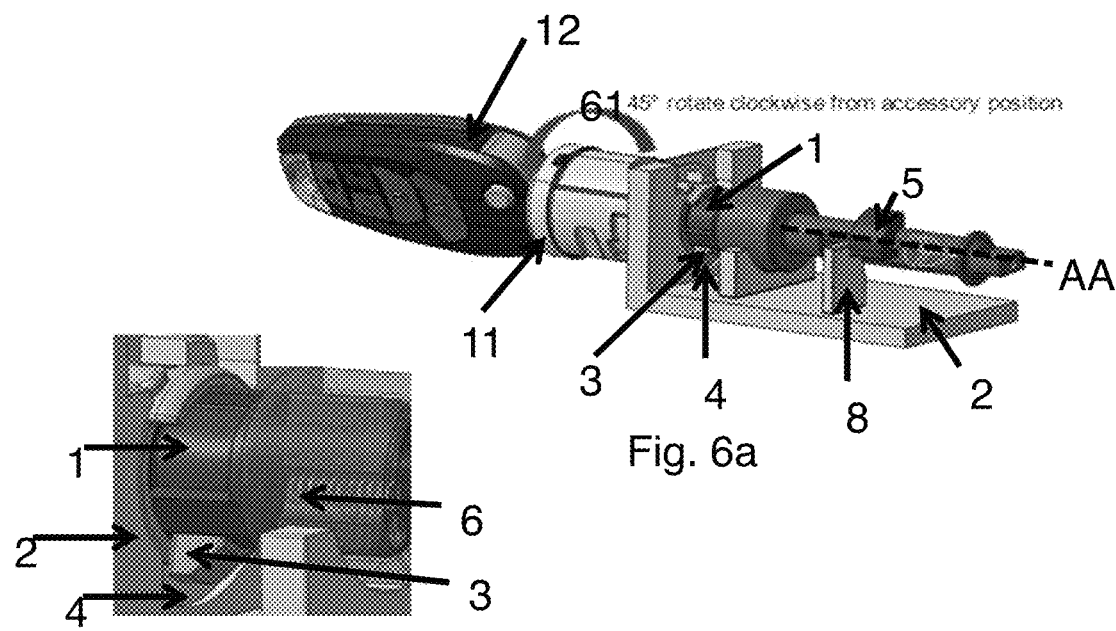
Fig. 6a
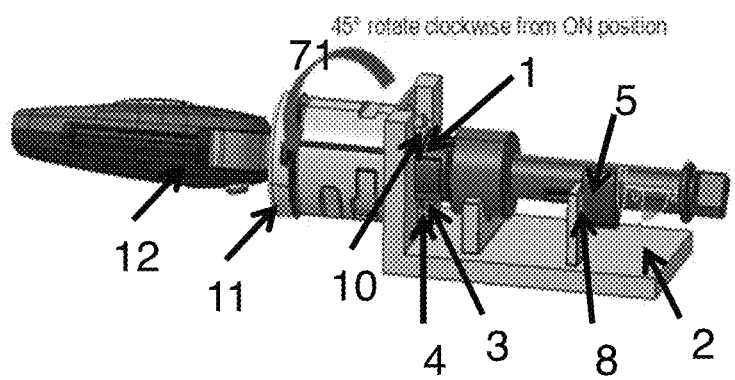
Fig. 6b
Fig. 7a
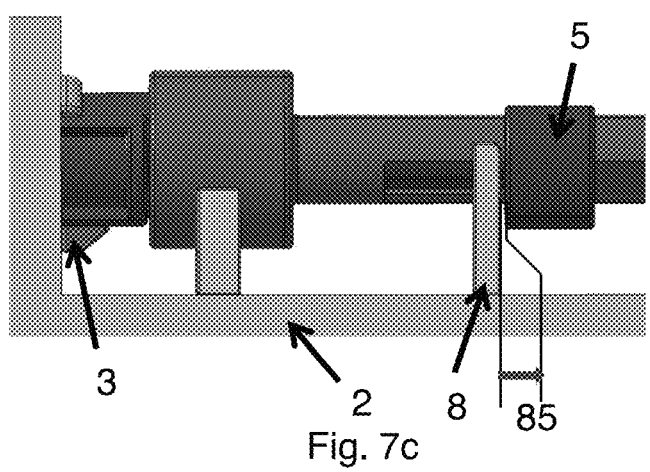
Fig. 7c
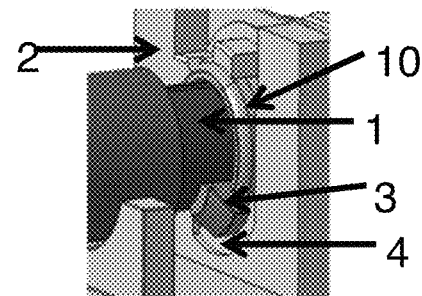
Fig. 7b

IGNITION DEVICE FOR A MOTOR OF AN AUTOMOTIVE VEHICLE

CROSS-REFERENCE TO RELATED APPLICATIONS

This application is a continuation of International Application No. PCT/EP2016/052010, filed on Jan. 30, 2016, which claims priority to and the benefit of EP 15305412.7 filed on Mar. 20, 2015. The disclosures of the above applications are incorporated herein by reference.

FIELD

The present disclosure relates to an ignition device for a motor of an automotive vehicle. The present disclosure also concerns a steering wheel lock device of an automotive vehicle comprising the ignition device for a motor of an automotive vehicle.

BACKGROUND

The statements in this section merely provide background information related to the present disclosure and may not constitute prior art.

Currently, an ignition device for a motor of an automotive vehicle comprises at least a latch able to receive a key, a stator and a rotor. The rotor is coupled to the latch and is mounted in rotation relative to the stator. The key, the latch and the rotor are coupled in rotation. The rotor of the ignition device can take distinctive indexed angular positions, such as:

a "stop" position, where the vehicle is not electrically supplied and where the vehicle combustion engine is off, a "on" position, where the vehicle is electrically supplied and authorizes the start of the vehicle combustion engine and a "start" position, where in addition to the "on" position functions, the starter is supplied to start the vehicle combustion engine.

Other positions can exist, as an example an "accessory" position. The "accessory" position is located between the "stop" and the "on" position and allows electrically supplying some accessories as the radio.

To start the motor of the vehicle, the user of the vehicle needs to introduce a predetermined key in the latch. The key is introduced while the rotor is in the "stop" position. After introducing the key in the latch, the user of the vehicle turns the key in the latch from the "stop" to the "accessory" position and then from the "accessory" to the "on" position, if there is an "accessory" position; otherwise, the user of the vehicle directly turns the key in the latch from the "stop" to the "on" position. In the "on" position, the vehicle is electrically supplied. Next, the user of the vehicle turns the key from the "on" position to the "start" position. When the key reaches the "start" position, the motor of the vehicle starts. Once the motor is started, the rotor returns to the "on" position.

To stop the motor of the vehicle, the user of the vehicle simply turns the key in the latch from the "on" to the "accessory" or to the "stop" position.

A mechanical system allows maintaining the key in a steady position while a voluntary action from the user of the vehicle, a rotation of the key, does not change this position. However, this system introduces two major inconveniences:

an involuntary action, as a knee knock in the key when the user of the vehicle is driving, can put the key out of the "on" position. From that moment, the key can reach an angular position where the electrical functions are no longer carried out. An involuntary stop of the motor can therefore be caused, and while the motor is started, owing to the automatic return of the key to the "on" position caused by a turning back means, if the key is violently moved from the "start" to the "on" position, the latter position can be overtook. The key is in an unindexed and unstable angular position. Therefore, rolling vibrations of the vehicle can pull the key away in a position where the electrical contact due to the "on" position is lost and therefore caused an involuntary stop of the motor when the vehicle is still running.

SUMMARY

The present disclosure inhibits the involuntary loss of the electrical contact due to the overtaking of the "on" position of the rotor of the ignition device and therefore inhibits the stop of the motor when the vehicle is still running.

To this end, an ignition device for a motor of an automotive vehicle according to the teachings of the present disclosure is proposed and comprises:

a rotor able to receive a key and mounted in rotation on a bracket, the rotor comprising a retainer configured to retain the rotor in translation relative to the bracket, a first push back device configured to apply a linear force between the bracket and the rotor along an axis parallel to the axis of the rotation of the rotor, and wherein the bracket and the retainer are configured to cooperate so as to inhibit the rotation of the rotor in a predetermined direction from a predetermined angular position and to allow the rotation of the rotor beyond the predetermined angular position in the predetermined direction upon preliminary applying a force on the rotor in the opposite direction to the direction of the linear force applied by the first push back device.

The ignition device for a motor of an automotive vehicle according to the present disclosure is relatively easy to assemble, not expensive to produce and allows enhancing the security of the user of the vehicle inhibiting the involuntary removal of the key when the vehicle is still running.

Indeed, the ignition device according to the teachings of the present disclosure inhibits an involuntary action to change the position of the rotor and therefore the involuntary stop of the motor when the vehicle is still running.

The cooperation between the bracket and the retainer inhibits the rotation of the rotor in a predetermined direction from a predetermined angular position and allows the rotation of the rotor beyond the predetermined angular position in the predetermined direction upon preliminary applying a force on the rotor in the opposite direction to the direction of the linear force applied by the first push back device.

More precisely, the cooperation between the bracket and the retainer inhibits the rotation of the rotor from the "on" to the "accessory" or to the "stop" position; and allows this rotation of the rotor upon preliminary applying a force on the rotor in the direction of the introduction of the key in the rotor.

The ignition device for a motor of an automotive vehicle according to the teachings of the present disclosure may further include one or any combination of the following features:

In one form bracket further comprises a recess wherein the said recess of the bracket and the retainer are configured to cooperate so as to inhibit the rotation of the rotor in a predetermined direction from a predetermined angular position and to allow the rotation of the rotor beyond the predetermined angular position in the predetermined direction upon preliminary applying a force on the rotor in the opposite direction to the direction of the linear force applied by the first push back device;

the recess is located on a planar surface of the bracket where the retainer is retained and the recess extends in the direction of the linear force applied by the first push back device;

the recess comprising a ramp able to receive the retainer; and the predetermined angular position corresponds to an intermediary position between the "stop" and the "start" position, specifically between the "on" and the "start" position;

In another form, the device further comprises:

a pin switch coupled in rotation to the rotor, and mounted in translation relative to the bracket, and wherein the rotor comprises a key detection device coupled with the pin switch, and configured to move through a first position to a second position when a key is introduced in the rotor, and wherein the key detection device and the pin switch are arranged so that moving from the first position of the key detection device to the second position of the key detection device move the pin switch from a rest position to an activated position, the activated position of the pin switch making an electrical contact;

the device further comprising a second push back device configured to apply a linear force between the bracket and the pin switch along an axis parallel to the axis of the rotation of the rotor from the activated position to the rest position;

the bracket further comprising a pad configured to maintain the pin switch in translation in the direction of the first push back device when the rotation of the rotor is beyond the predetermined angular position;

the ramp cooperates with the retainer so as to make a gap between the pad and the pin switch so as to limit the friction between the pad and the pin switch in a predetermined direction from a predetermined angular position;

the ramp cooperates with the retainer so as to make the retainer coming back to the "on" position due to the linear force applied by the first push back device;

the first push back device is a spring; and the second push back device is a spring.

The present disclosure further relates to a steering wheel lock device of an automotive vehicle comprising an ignition device according to the teachings of the present disclosure including one or any combination of the following features:

the steering wheel lock device further comprising a cam linked in rotation to the rotor, fixed in translation relative to the bracket, the rotation axis of the cam is parallel to the rotation axis of the rotor and the cam is configured to activate a steering wheel lock device;

the pin switch is linked in rotation with the cam; and the pin switch is located in the cam and is mounted in translation relative to the cam.

Further areas of applicability will become apparent from the description provided herein. It should be understood that the description and specific examples are intended for purposes of illustration only and are not intended to limit the scope of the present disclosure.

DRAWINGS

Figure 2:
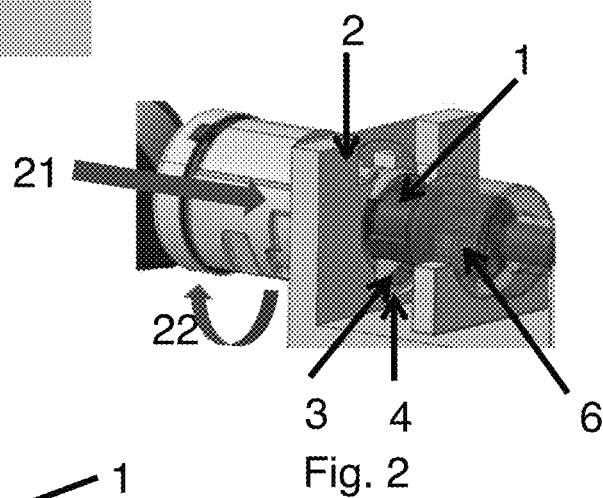
Figure 3A:
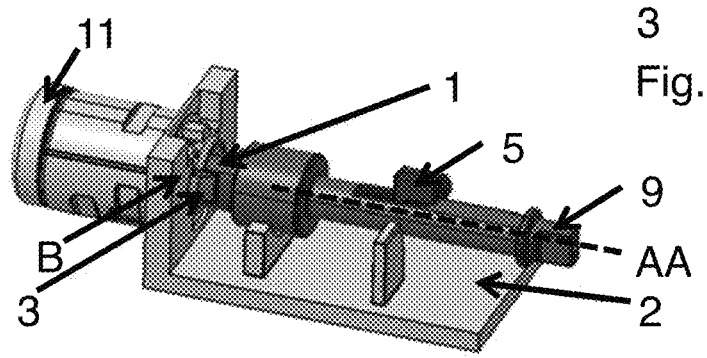
Figure 3B:
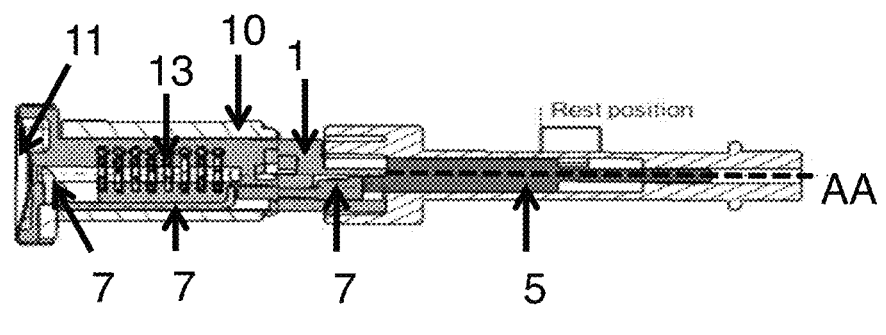
Figure 4A:
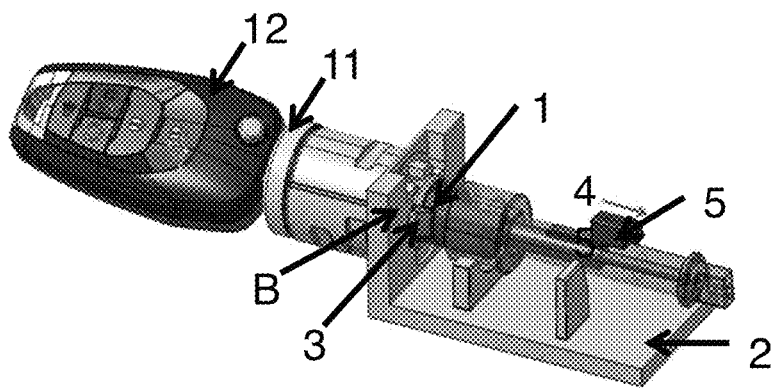
Figure 4B:
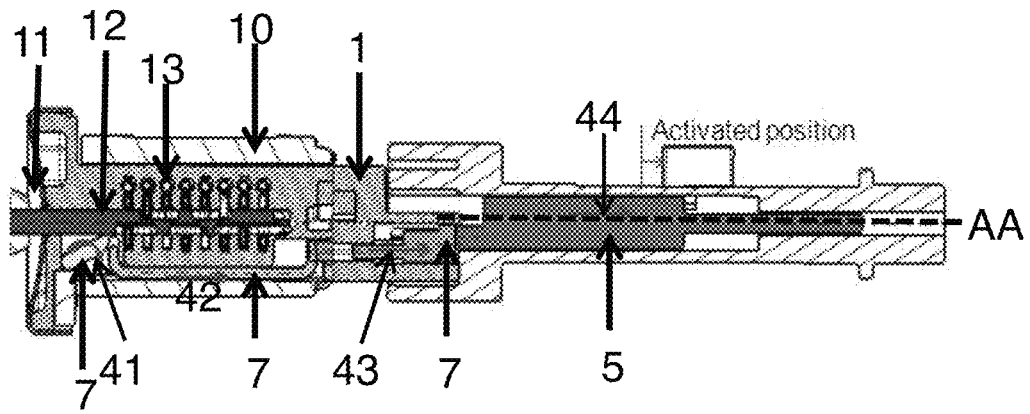
Figure 5:
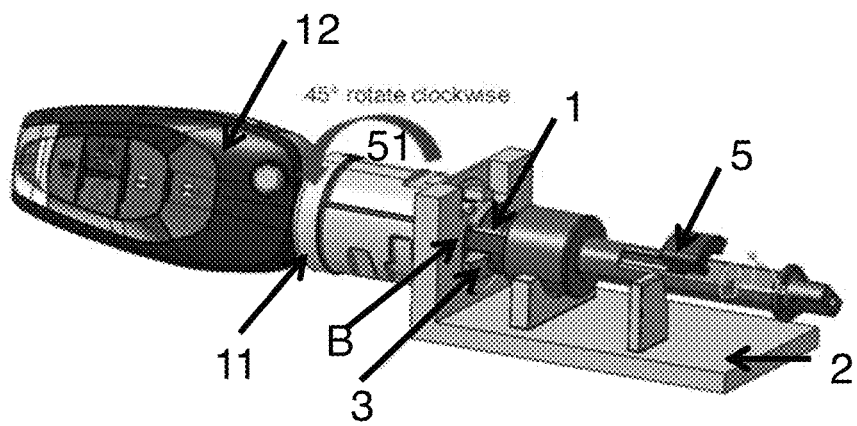
Figure 8A:
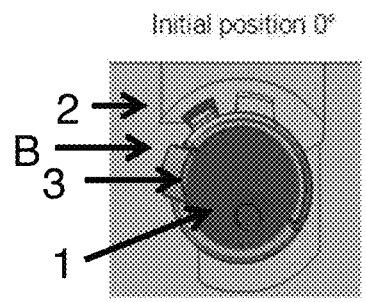
Figure 8B:
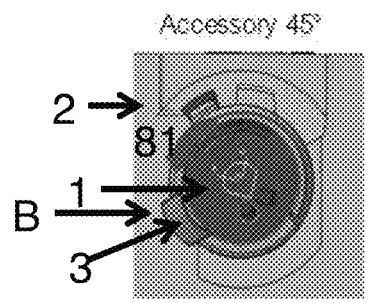
Figure 8C:
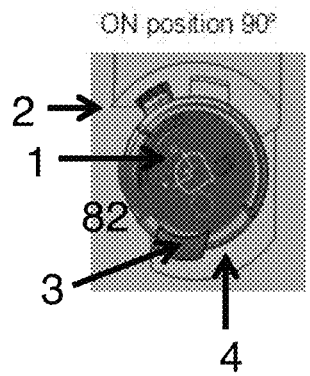
Figure 8D:
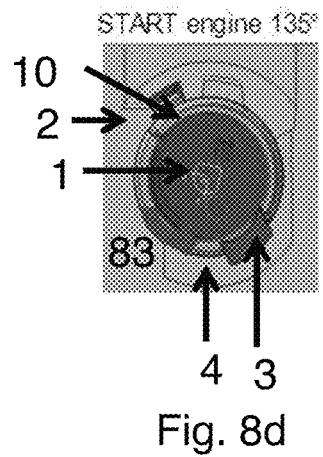

In order that the disclosure may be well understood, there will now be described various forms thereof, given by way of example, reference being made to the accompanying drawings, in which:

FIG. 1 is a perspective view of a part of an ignition device according to a form of the present disclosure, with the rotor in the "stop" position, FIG. 2 is a perspective view of FIG. 1, with the rotor in the "on" position, FIG. 3a is a perspective view of a steering wheel lock device of FIG. 1, with the rotor in the "stop" position, FIG. 3b is a cross-section view along the translation axis AA of the rotor of FIG. 3a, with the rotor in the "stop" position, FIG. 4a is a perspective view of a steering wheel lock device of FIG. 3a, with the rotor in the "stop" position, FIG. 4b is a cross-section view along the translation axis AA of the rotor of FIG. 4a, with the rotor in the "stop" position, FIG. 5 is a perspective view of a steering wheel lock device of FIG. 3a, with the rotor in the "accessory" position, FIG. 6a is a perspective view of a steering wheel lock device of FIG. 3a, with the rotor in the "on" position, FIG. 6b is a perspective view of a part of an ignition device of FIG. 6a, with the rotor in the "on" position, FIG. 7a is a perspective view of a steering wheel lock device of FIG. 3a, with the rotor in the "start" position, FIG. 7b is a perspective view of a part of the ignition device of FIG. 7a, with the rotor in the "start" position, FIG. 7c is a side view of a part of the ignition device according to another form of the present disclosure, wherein bracket comprises a ramp, FIG. 8a is a front view of a part of an ignition device of FIG. 1, with the rotor in the "stop" position, FIG. 8b is a part of an ignition device of FIG. 8a, with the rotor in the "accessory" position, FIG. 8c is a part of an ignition device of FIG. 8a, with the rotor in the "on" position, and FIG. 8d is a part of an ignition device of FIG. 8a, with the rotor in the "start" position.

Figure 9A:
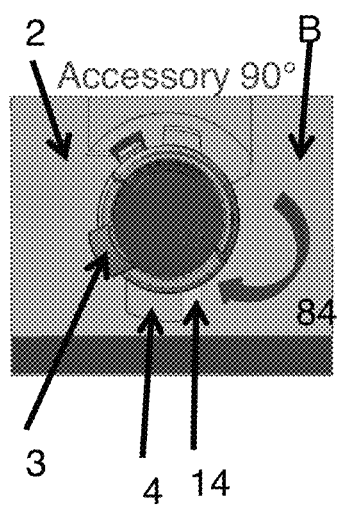
Figure 9B:
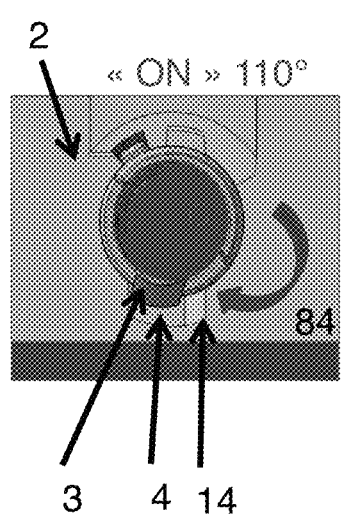
Figure 9C:
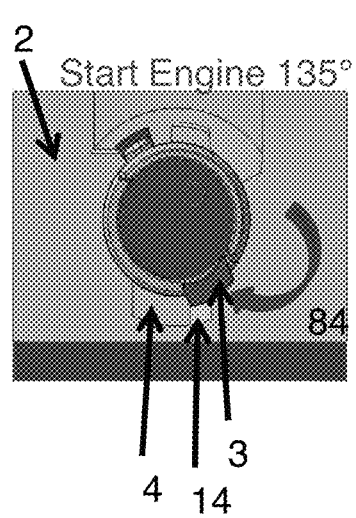

FIGS. 9a to 9c are front views of a part of an ignition device according to another form of the present disclosure, wherein the bracket comprises a ramp at the "accessory", "on" and "start" positions.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An ignition device for a motor of an automotive vehicle according to the teachings of the present disclosure is illustrated in FIG. 1.

The ignition device comprises a rotor 1 able to receive a key and mounted in rotation on a bracket 2. The rotor 1 comprises a retainer 3 configured to retain the rotor 1 in translation relative to the bracket 2. The rotor is in the "stop" position, i.e. in the initial position. The "stop" position is referenced as a rotation of 0°.

The ignition device also comprises a first push back device 6. The first push back device 6 is configured to apply a linear force between the bracket 2 and the rotor 1 along an axis $A_1A_1$ parallel to the axis AA of the rotation of the rotor 1.

The bracket 2 and the retainer 3 are configured to cooperate so as to inhibit the rotation of the rotor 1 in a predetermined direction from a predetermined angular position and to allow the rotation of the rotor 1 beyond the predetermined angular position in the predetermined direction upon preliminary applying a force on the rotor 1 in the opposite direction to the direction of the linear force applied by the first push back device 6.

The predetermined angular position may correspond to an intermediary position between the "stop" and the "start" position. The predetermined angular position in one form corresponds to the "on" position.

The predetermined translation direction corresponds to a movement from the "start" to the "stop" position. The predetermined translation direction in one form corresponds to a movement from the "on" to the "start" position. The predetermined translation direction in another form corresponds to a movement from the "on" to the "accessory" position, if there is an "accessory" position.

The first push back device 6 in one form is a spring.

In one form, represented in FIG. 1, the bracket 2 comprises a recess 4.

The recess 4 of the bracket 2 is configured to cooperate with the retainer 3, so as to inhibit the rotation of the rotor 1 in the predetermined direction from the predetermined angular position and to allow the rotation of the rotor 1 beyond the predetermined angular position in the predetermined direction upon preliminary applying a force on the rotor 1 in the opposite direction to the direction of the linear force applied by the first push back device 6.

The recess 4 is located on a planar surface B of the bracket 2 where the retainer 3 is retained. The recess 4 extends in the direction of the linear force applied by the first push back device 6. More precisely, the recess 4 extends in the opposite direction of the introduction of the key.

The recess 4 should be sufficiently deep to inhibit the rotation of the rotor 1 in the predetermined direction from the predetermined angular position if the user of the vehicle, or an involuntary action of the user of the vehicle, tries to force the rotation of the rotor 1 in the predetermined direction from the predetermined angular position.

In FIG. 2, a part of the ignition device according to the teachings of the present disclosure is represented.

The retainer 3 cooperates with the recess 4 of the bracket 2. The retainer 3 is in the recess 4 of the bracket 2. The rotor is in the "on" position, referenced as a rotation of around 90° or 110°. The first push back device 6 is stretched.

With the stretching of the first push back device 6 and the depth of the recess 4, a rotation movement of the rotor 1 from the "on" to the "start" position is possible, but a rotation movement of the rotor 1 from the "on" to the "accessory" or to the "stop" position is not possible.

Indeed, with the stretching of the first push back device 6 and the depth of the recess 4, it is not possible to return from the "on" to the "accessory" or to the "stop" position, with only a rotation movement.

With a push force in the opposite direction to the direction of the linear force applied by the first push back device 6 is applied to the rotor 1, the first push back device 6 is compressed. The compression of the first push back device 6 leads the retainer 3 to get out of the recess 4 of the bracket 2. A rotation of the rotor from the "on" to the "accessory" or to the "stop" position is possible.

With only a translation movement of the rotor 1 relative to the bracket 2 or only a rotation movement of the rotor 1 relative to the bracket 2, the rotation of the rotor 1 from the "on" position to the "accessory" position or to the "stop" position is not possible The combination of a translation movement of the rotor 1 relative to the bracket 2 and of a rotation movement of the rotor 1 relative to the bracket 2 allows the rotation of the rotor 1 from the "on" position to the "accessory" or to the "stop" position.

The arrow 21 represents the translation movement of the rotor 1 relative to the bracket 2 when a force in the opposite direction to the direction of the linear force applied by the first push back device 6 is applied on the rotor 1 to get the retainer 3 out of the recess 4 of the bracket 2. The arrow 21 is in the opposite direction to the direction of the linear force applied by the first push back device 6.

The arrow 22 represents the rotation of the rotor 1 to return from the "on" to the "accessory" or to the "stop" position after applying a force in the opposite direction to the direction of the linear force applied by the first push back device 6 on the rotor to get the retainer 3 out of the recess 4 of the bracket 2.

The combination of the movements represented by the arrows (21, 22) allows the rotation of the rotor 1 from the "on" to the "accessory" or to the "stop" position.

FIG. 3a represents a part of a steering wheel lock device comprising an ignition device according to the teachings of the present disclosure.

The rotor is in the "stop" position, i.e. in the initial position. The retainer 3 cooperates with the bracket 2. The retainer 3 cooperates with a planar surface B of the bracket 2.

The ignition device further comprises a latch 11. The latch 11 is able to receive a key. The rotor 1 is coupled to the latch 11. No key is in the rotor 1 or in the latch 11.

The steering wheel lock device further comprises a cam 9. The cam 9 is linked in rotation to the rotor 1 and fixed in translation relative to the bracket 2. The rotation axis $A_2A_2$ of the cam 9 is parallel to the rotation axis AA of the rotor 1. The cam 9 is configured to activate a steering wheel lock.

The rotation axis $A_2A_2$ of the cam 9 may be the same axis as the rotation axis AA of the rotor 1.

In FIG. 3a, the rotation axis $A_2A_2$ of the cam 9 is the same axis as the rotation axis AA of the rotor 1.

The ignition device further comprises a pin switch 5 allowing an electrical contact that control the presence of the key in the rotor. The pin switch 5 acts as a detector of the presence of the key in the rotor. The pin switch 5 is coupled in rotation to the rotor 1 and is mounted in translation relative to the bracket 2.

The pin switch 5 can take a first and a second position. The first position of the pin switch 5 corresponds to a rest position. In the rest position, no electrical contact is established by the pin switch 5. The second position of the pin switch 5 corresponds to an activated position. In the activated position, the pin switch 5 established an electrical contact that confirms the presence of the key in the rotor 1.

The pin switch 5 in one form is linked in rotation with the cam 9. The pin switch 5 is in another form located in the cam 9. The pin switch 5 is in yet another form mounted in translation relative to the cam 9.

In FIG. 3a, the pin switch 5 is in a rest position and is partially located in the cam 9.

FIG. 3b represents a cross-section along the translation axis AA of the rotor of a steering wheel lock device. The steering wheel lock device comprises an ignition device according to the present disclosure.

The rotor 1 is in the "stop" position referenced as a rotation of 0°. No key is in the rotor 1 or in the latch 11. The pin switch 5 is in the rest position. No electrical contact with the light indicator of the presence of the key in the rotor is established by the pin switch 5.

The rotor 1 of the ignition device further comprises a key detection device 7. The key detection device 7 is coupled with the pin switch 5.

The key detection device 7 moves through a first to a second position when the key is introduced in the rotor 1 or in the latch 11. The first position of the key detection device 7 corresponds to the position where no key is introduced in the rotor 1 or in the latch 11. The second position of the key detection device 7 corresponds to the position where a predetermined key is introduced in the rotor 1 or in the latch 11. Moving from the first to the second position of the key detection device 7 moves the pin switch 5 from a rest position to an activated position.

In FIG. 3b, the key detection device 7 is in the first position.

In one form, the key detection device 7 comprises three elements. Each element of the key detection device 7 moves through a first to a second position. The first position of the elements of the key detection device 7 corresponds to the position where no key is introduced in the rotor 1 or in the latch 11. The second position of the elements of the key detection device 7 corresponds to the position where a predetermined key is introduced in the rotor 1 or in the latch 11.

When no key is introduced in the rotor 1 or in the latch 11, the three elements of the key detection device 7 are in the first position. When a key is introduced in the rotor 1 or in the latch 11, the first element of the key detection device 7 moves from its first to its second position. Moving from the first to the second position of the first element of the key detection device 7, leads the second element of the key detection device 7 to move from its first to its second position. Moving from the first to the second position of the second element of the key detection device 7, leads the third element of the key detection device 7 to move from its first to its second position.

Moving from the first to the second position of the third element of the key detection device 7, leads the pin switch 5 to move from the rest to the activated position.

The ignition device also comprises a stator 10. The stator 10 is fixed in translation and in rotation relative to the bracket 2. The rotor 1 is mounted in rotation relative to the stator 10.

The ignition device also comprises lock members 13. The lock members 13 are configured to cooperate with the stator 10 in order to maintain the rotor 1 in rotation relative to the stator 10 and to release the rotor 1 in rotation relative to the stator 10 when a predetermined key 12 is introduced in the rotor 1 or in the latch 11.

In FIG. 3b, the lock members 13 cooperate with the stator 10 in order to maintain the rotor 1 in rotation relative to the stator 10.

In FIG. 4a, a part of a steering wheel lock device comprising an ignition device according to the teachings of the present disclosure is represented.

The rotor 1 is in the "stop" position, i.e. in the initial position. A predetermined key 12 is in the rotor 1 or in the latch 11. The retainer 3 cooperates with the bracket 2. The retainer 3 cooperates with a planar surface B of the bracket 2. The pin switch 5 is in the activated position. The activated position of the pin switch 5 allows putting an electrical contact with the light indicator of the presence of the key in the rotor.

The arrow 45 shows the movement of the pin switch 5 when the pin switch moves from the rest position to the activated position, i.e. when the key is introduced in the rotor 1 or in the latch 11.

In FIG. 4b, a cross-section along the translation axis AA of the rotor of a steering wheel lock device comprising an ignition device according to the teachings of the present disclosure is represented.

The rotor 1 is in the "stop" position referenced as a rotation of 0°. A predetermined key 12 is in the rotor 1 or in the latch 11. The key detection device 7 is in the second position. The pin switch 5 is in the activated position. The activated position of the pin switch 5 allows putting an electrical contact with the light indicator of the presence of the key in the rotor. The lock members 13 cooperate with the stator 10 in order to release the rotor 1 in rotation relative to the stator 10.

The arrows (41, 42, 43) represent the movement of the elements of the key detection device 7 when the key is introduced in the rotor 1 or in the latch 11, i.e. when the elements of the key detection device 7 moves from a first to a second position.

The arrow 44 shows the movement of the pin switch 5 when the pin switch moves from the rest position to the activated position, i.e. when the key is introduced in the rotor 1 or in the latch 11.

FIG. 5 represents a part of a steering wheel lock device comprising an ignition device according to the teachings of the present disclosure.

The rotor 1 is in the "accessory" position. A predetermined key 12 is in the rotor 1 or in the latch 11. The pin switch 5 is in the activated position.

The rotor 1 makes a rotation relative to the bracket 2 from the initial position referenced as a rotation of 0° to the "accessory" position referenced as a rotation of around 45° or 90°.

The rotor 1, the retainer 3 and the key 12 are linked in rotation. The retainer 3 cooperates with the bracket 2. The retainer 3 cooperates with a planar surface B of the bracket 2. The retainer 3 is free to rotate. A rotation of the rotor relative to the bracket 2 from the "accessory" to the "stop" or to the "start" position is possible.

The arrow 51 represents the movement of the key moving from the "stop" to the "accessory" position.

In FIG. 6a, a part of a steering wheel lock device comprising an ignition device according to the teachings of the present disclosure is represented.

The rotor 1 is in the "on" position. A predetermined key 12 is in the rotor 1 or in the latch 11.

The rotor 1 makes a rotation from the initial position referenced as a rotation of 0° or from the "accessory" position referenced as a rotation of around 45° or 90° to the "on" position referenced as a rotation of around 90° or 110°.

The rotor 1, the retainer 3 and the key 12 are linked in rotation. The retainer 3 cooperates with the recess 4 of the bracket 2. The retainer 3 is in the recess 4 of the bracket 2. The compression of the first push back device inhibits returning in the "accessory" or in the "stop" position with only a rotation movement.

The ignition device further comprises a second push back device (not shown). The second push back device is configured to apply a linear force between the bracket 2 and the pin switch 5 along an axis $A_3A_3$ parallel to the axis AA of the rotation of the rotor 1 from the activated to the rest position.

The rotation axis $A_3A_3$ of the pin switch 5 may be the same axis as the rotation axis AA of the rotor 1.

In FIG. 6a, the rotation axis $A_3A_3$ of the pin switch 5 is the same axis as the rotation axis AA of the rotor 1.

The second push back device in one form is a spring.

In FIG. 6a, the second push back device is compressed. With the compression of the second push back device, the pin switch 5 moves in translation movement from the activated to the rest position.

The ignition device further comprises a pad 8. The pad 8 is configured to maintain the pin switch 5 in translation in the direction of the first push back device when the rotation of the rotor 1 is beyond the predetermined angular position.

The second push back device is compressed and leads the pin switch 5 to cooperate with a side of the pad 8 in the direction of the force applied by the second push back device. The pin switch 5 is maintained in translation in the activated position by the pad 8. The pad inhibits to lose the electrical contact of the pin switch 5 with the light indicator of the presence of the key in the rotor.

If the pad 8 was not present, when the retainer 3 cooperates with the recess 4 of the bracket 2, the second push back device would make the pin switch 5 moving in translation. The pin switch 5 would move toward the rest position. The electrical contact with the light indicator of the presence of the key in the rotor may be lost.

With the pad 8, the pin switch 5 is maintained in the activated position and therefore the electrical contact with the light indicator of the presence of the key in the rotor 1 is also maintained.

The arrow 61 represents the movement of the key moving from the "accessory" to the "on" position.

In FIG. 6b, a part of an ignition device according to the teachings of the present disclosure is represented.

The rotor 1 is in the "on" position. A predetermined key is in the rotor 1 or in the latch.

The rotor 1 makes a rotation from the initial position referenced as a rotation of 0° or from the "accessory" position referenced as a rotation of around 45° or 90° to the "on" position referenced as a rotation of around 90° or 110°.

The rotor 1, the retainer 3 and the key are linked in rotation. The retainer 3 cooperates with the recess 4 of the bracket 2. The retainer 3 is in the recess 4 of the bracket 2. The compression of the first push back device 6, inhibit to return in the "accessory" or in the "stop" position with only a rotation movement. The pin switch is in the activated position. The pin switch is maintained in translation by the pad.

In FIG. 7a, a part of a steering wheel lock device is represented. The steering wheel lock device comprises an ignition device according to the present disclosure.

The rotor 1 is in the "start" position. A predetermined key 12 is in the rotor 1 or in the latch 11.

The rotor 1 makes a rotation from the "on" position referenced as a rotation of 90° or 110° to the "start" position referenced as a rotation of 135°.

The rotor 1, the retainer 3 and the key 12 are linked in rotation. The retainer 3 cooperates with the recess 4 of the bracket 2. The retainer 3 is in the recess 4 of the bracket 2. The compression of the first push back device inhibits to return in the "accessory" or in the "stop" position with only a rotation movement.

The retainer 3 is blocked in rotation at 135° by the stator 10 or by the bracket 2. The pin switch is in the activated position. The pin switch 5 is maintained in translation by the pad 8.

The arrow 71 represents the movement of the key moving from the "on" to the "start" position.

In FIG. 7b, a part of an ignition device according to the teachings of the present disclosure is represented.

The rotor 1 is in the "start" position. A predetermined key is in the rotor 1 or in the latch.

The rotor 1 makes a rotation from the "on" position referenced as a rotation of around 90° or 110° to the "start" position referenced as a rotation of 135°.

The rotor 1, the retainer 3 and the key are linked in rotation. The retainer 3 cooperates with the recess 4 of the bracket 2. The retainer 3 is in the recess 4 of the bracket 2. The compression of the first push back device inhibits to return in the "accessory" or in the "stop" position with only a rotation movement.

The retainer 3 is blocked in rotation at 135° by the stator 10 or by the bracket 2. The pin switch is in the activated position. The pin switch is maintained in translation by the pad.

FIG. 7c represents a part of an ignition device according to the present disclosure in which the recess 4 comprises a ramp. The ramp of the recess 4 cooperates with the retainer 3 so as to make a gap 85 between the pad 8 and the pin switch 5 at a predetermined angular position between "on" and "start" position but after the recess position. The gap 85 between the pad 8 and the pin switch 5 limits the friction between the pad 8 and the pin switch 5 in a predetermined direction from a predetermined angular position.

FIG. 8a represents a part of an ignition device according to the present disclosure.

The rotor 1 is in the "stop" position. In the "stop" position, the vehicle is not electrically supplied and the vehicle combustion engine is off. The retainer 3 cooperates with the bracket 2. The retainer 3 cooperates with a planar surface B of the bracket 2.

FIG. 8b represents a part of an ignition device according to the teachings of the present disclosure.

The rotor 1 is in the "accessory" position. The rotor 1 makes a rotation from the initial position referenced as a rotation of 0° to the "accessory" position referenced as a rotation of around 45° or 90°. The retainer 3 cooperates with the bracket 2. The retainer 3 cooperates with a planar surface B of the bracket 2. In the "accessory" position, the electrical contacts of the accessories are activated.

The arrow 81 represents the movement of the key moving from the initial position to the "accessory" position, i.e. a rotation from 0° to around 45° or 90°.

FIG. 8c represents a part of an ignition device according to the teachings of the present disclosure.

The rotor 1 is in the "on" position. The rotor 1 makes a rotation from the initial position referenced as a rotation of 0° or from the "accessory" position referenced as a rotation of around 45° or 90°, to the "on" position referenced as a rotation of around 90° or 110° respectively. The retainer 3 cooperates with the recess 4 of the bracket 2. In the "on" position, the vehicle is electrically supplied and authorizes the start of the vehicle combustion engine.

The arrow 82 shows the movement of the key moving from the "accessory" to the "on" position, i.e. a rotation from around 45° or 90° to around 90° or 110°, respectively.

FIG. 8d represents a part of an ignition device according to teachings of the present present disclosure.

The rotor 1 is in the "start" position. The rotor 1 makes a rotation from the initial position referenced as a rotation of 0° or from the "on" position referenced as a rotation of around 90° or 110° to the "start" position referenced as a rotation of around 135°. The retainer 3 cooperates with the recess 4 of the bracket 2. In addition to the "on" position functions, the starter is supplied to start the vehicle combustion engine. The retainer 3 is stopped in rotation by the stator 10 or by the bracket 2. When the retainer 3 reaches the "start" position, the first push back device applies a force on the retainer 3 in the direction from the "start" to the "on" position, in order to put the rotor back in the "on" position.

The arrow 83 represents the movement of the key moving from the "on" to the "start" position, i.e. a rotation from around 90° or 110° to around 135°.

FIGS. 9a, 9b and 9b represent a part of an ignition device according to the teachings of the present disclosure wherein the recess 4 comprises a ramp 14.

The ramp is able to receive the retainer 3. The ramp 14 of the recess 4 cooperates with the retainer so as to allow a rotation of the rotor in a predetermined direction from a predetermined angular position, more precisely the rotation of the rotor from the "on" to the "start" position. The rotation is quite smooth, regular and/or continuous.

The ramp 14 cooperates with the retainer 3 so as to make the retainer 3 come back to the "on" position due to the linear force applied by the first push back device.

The ramp of the bracket is located on of the recess 4 of the bracket 2 where the retainer is sliding on. The ramp extends from the recess 4 to the planar surface B of the bracket 2.

When the rotor rotates from the "on" to the "start" position, the retainer climbs on the ramp of the bracket until the ramp's end. In the "on" position, the retainer falls on the recess planar surface of the bracket. A rotation movement of the rotor from the "on" to the "start" position is possible, but a rotation movement of the rotor from the "on" to the "accessory" or to the "stop" position is not possible, because of the height of the recess. The ramp is positioned after the recess between the "on" and "start" positions.

The height of the start of the ramp 14 is as the same level as the recess 4. The height of the end of the ramp 14 is at the same level as the planar surface B of the bracket 2.

In FIG. 9a, the rotor is in the accessory position. The retainer 3 cooperates with the planar surface B of the bracket 2.

In FIG. 9b, the rotor is in the "on" position. The retainer cooperates with the recess 4 of the bracket 2. The retainer 3 is in the recess 4 of the bracket 2.

In FIG. 9c, the rotor is in the "start" position. The retainer cooperates with the ramp 14 of the recess 4.

In FIGS. 9a to 9c, the arrow 84 represents the movement of the key moving from the "start" to the "on" position, i.e. a rotation from around 135° to around 90° or 110°. The arrow 84 also represents the movement of the retainer 3 going back in the recess 4.

It is to be understood that the foregoing description is intended to illustrate and not to limit the scope of the present disclosure, which is defined by the following claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An ignition device for a motor of an automotive vehicle, the device comprising:
a rotor configured to receive a key and mounted in rotation on a bracket, the rotor comprising a retainer configured to inhibit translation of the rotor in a first direction relative to the bracket; and
a first push back device between the bracket and the rotor and configured to bias the rotor in the first direction along an axis parallel to an axis of the rotation of the rotor,
wherein the bracket and the retainer are configured to cooperate so as to inhibit rotation of the rotor in a predetermined direction from a predetermined angular position and to allow the rotation of the rotor beyond the predetermined angular position in the predetermined direction upon preliminary applying a force on the rotor in a second direction, opposite to the first direction of the linear force applied by the first push back device,
wherein the rotor is configured to receive the key in the second direction.

2. The ignition device according to claim 1, wherein the bracket further comprises a recess, and wherein the recess of the bracket and the retainer are configured to cooperate so as to inhibit rotation of the rotor.

3. The ignition device according to claim 2, wherein the recess is located on a planar surface of the bracket where the retainer is retained and the recess extends in the direction of the linear force applied by the first push back device.

4. The ignition device according to claim 2, wherein the recess comprises a ramp configured to receive the retainer.

5. The ignition device according to claim 1, wherein the predetermined angular position corresponds to an intermediary position between a "stop" and a "start" position.

6. The ignition device according to claim 1, further comprising
a pin switch coupled in rotation to the rotor, and mounted in translation relative to the bracket, and
wherein the rotor comprises a key detection device coupled with the pin switch, and configured to move through a first position to a second position when the key is introduced in the rotor, and
wherein the key detection device and the pin switch are arranged so that moving from the first position of the key detection device to the second position of the key detection device move the pin switch from a rest position to an activated position, the activated position of the pin switch making an electrical contact.

7. The ignition device according to claim 6, further comprising a second push back device configured to apply a linear force between the bracket and the pin switch along an axis parallel to the axis of the rotation of the rotor from the activated position to the rest position.

8. The ignition device according to claim 7, wherein the bracket further comprises a pad configured to maintain the pin switch in translation in the direction of the first push back device when the rotation of the rotor is beyond the predetermined angular position.

9. The ignition device according to claim 8,
wherein the recess comprises a ramp configured to receive the retainer, and
the ramp cooperates with the retainer so as to make a gap between the pad and the pin switch so as to limit the friction between the pad and the pin switch in a predetermined direction from a predetermined angular position.

10. The device according to claim 9, wherein the ramp cooperates with the retainer so as to make the retainer coming back to the "on" position due to the linear force applied by the first push back device.

11. The device according to claim 7, wherein the second push back device is a spring.

12. The device according to claim 1, wherein the first push back device is a spring.

13. A steering wheel lock device of an automotive vehicle, the device comprising:
the ignition device for a motor of an automotive vehicle according to claim 1; and
a cam linked in rotation to the rotor and fixed in translation relative to the bracket;
wherein a rotation axis of the cam is parallel to the rotation axis of the rotor, and configured to activate a steering wheel lock device.

14. The device according to claim 13, wherein the pin switch is linked in rotation with the cam.

15. The device according to claim 13, wherein the pin switch is located in the cam and is mounted in translation relative to the cam.

16. An ignition device for a motor of an automotive vehicle, the device comprising:
a rotor configured to receive a key and mounted in rotation on a bracket, the rotor comprising a retainer configured to inhibit translation of the rotor in a first direction relative to the bracket; and
a first push back device between the bracket and the rotor and configured to bias the rotor in the first direction along an axis parallel to an axis of the rotation of the rotor,
the bracket and the retainer are configured to cooperate so as to inhibit rotation of the rotor in a predetermined direction from a predetermined angular position and to allow the rotation of the rotor beyond the predetermined angular position in the predetermined direction upon preliminary applying a force on the rotor in a second direction, opposite to the first direction of the linear force applied by the first push back device;
the bracket further comprises a recess, and wherein the recess of the bracket and the retainer are configured to cooperate so as to inhibit rotation of the rotor;
wherein the recess comprises a ramp configured to receive the retainer,
wherein the rotor is configured to receive the key in the second direction.

17. An ignition device according to claim 16, wherein the ramp cooperates with the retainer so as to make the retainer coming back to the "on" position due to the linear force applied by the first push back device.

18. An ignition device for a motor of an automotive vehicle, the device comprising:
a rotor configured to receive a key and mounted in rotation on a bracket, the rotor comprising a retainer configured to inhibit translation of the rotor in a first direction relative to the bracket; and
a first push back device between the bracket and the rotor and configured to bias the rotor in the first direction along an axis parallel to an axis of the rotation of the rotor,
the bracket and the retainer are configured to cooperate so as to inhibit rotation of the rotor in a predetermined direction from a predetermined angular position and to allow the rotation of the rotor beyond the predetermined angular position in the predetermined direction upon preliminary applying a force on the rotor in a second direction, opposite to the first direction of the linear force applied by the first push back device;
the ignition device further comprising
a pin switch coupled in rotation to the rotor, and mounted in translation relative to the bracket, and
wherein the rotor is configured to receive the key in the second direction and comprises a key detection device coupled with the pin switch, and configured to move through a first position to a second position when the key is introduced in the rotor, and
wherein the key detection device and the pin switch are arranged so that moving from the first position of the key detection device to the second position of the key detection device move the pin switch from a rest position to an activated position, the activated position of the pin switch making an electrical contact.

19. The ignition device according to claim 18, wherein the bracket further comprises a pad configured to maintain the pin switch in translation in the direction of the first push back device when the rotation of the rotor is beyond the predetermined angular position.

20. The ignition device according to claim 19,
wherein the recess comprises a ramp configured to receive the retainer, and
the ramp cooperates with the retainer so as to make a gap between the pad and the pin switch so as to limit the friction between the pad and the pin switch in a predetermined direction from a predetermined angular position.

* * * * *